United States Patent
Anderson

[11] 3,734,514
[45] May 22, 1973

[54] CROSS-OVER SEALING MEANS

[76] Inventor: Preston W. Anderson, 10243 Sherrill St., Whittier, Calif. 90601

[22] Filed: June 28, 1971

[21] Appl. No.: 157,340

[52] U.S. Cl. ................................... 277/233, 285/157
[51] Int. Cl. ................................................ F16j 15/06
[58] Field of Search ..................... 285/157; 277/233, 277/235, 227, 234, 237

[56] References Cited

UNITED STATES PATENTS

| 529,831 | 11/1894 | Peckham et al. | 277/233 |
| 1,292,392 | 1/1919 | Esnault-Pelterie | 277/233 |
| 1,557,775 | 10/1925 | Robertson | 277/235 B |
| 1,626,110 | 4/1927 | Bailey et al. | 277/235 B |
| 1,815,893 | 7/1931 | Bailey | 277/232 |
| 2,267,315 | 12/1941 | Stikeleather | 285/157 |
| 2,409,023 | 10/1946 | Dies | 285/157 |

Primary Examiner—Samuel B. Rothberg
Assistant Examiner—Robert L. Smith
Attorney—J. Carroll Baisch

[57] ABSTRACT

Sealing means for cross-over fuel line connections for internal fuel lines in cylinder heads of deisel engines having a plurality of such heads. The internal fuel lines terminate in recesses adjacent the adjacent edges of such heads and there is a plate with cross-over tubes which communicate with such recesses.

The sealing means includes a lower neoprene gasket, a high-pressure, rigid asbestos gasket and, on top of this asbestos gasket, there is an upper neoprene gasket which is at the underside of the plate. There is a cone for each end of each cross-over tube and each cone has a shank extending from an outwardly-flared base. The shank tapers from the small end of the base and the outside diameter of the small end of each shank is smaller than the inside diameter of the cross-over tubes, while the outside diameter of the larger end of the shank is greater than the inside diameter of said tubes. The neoprene and asbestos gaskets have aligned holes therethrough for reception of the shanks of the cones, the shanks of said cones being pressed into the ends of the cross-over tubes so that such shanks have sealing connections with said tubes.

On the shanks and between the asbestos gasket and the lower neoprene gasket are flat, resilient, washer-like pressure elements fitting snugly on the cones at the junction of the shanks and the respective bases. The bases have small flanges extending radially from their free ends and said flanges are adapted to fit closely into the recesses in the cylinder heads. A second washer-like resilient seal is disposed on each cone below the lower neoprene gasket, said second seal resting on the base of the cone.

There are screws extending through openings provided therefor in the gaskets for securing the assembly to the adjacent edges of the adjacent cylinder heads, and when said screws are tightened the gaskets and cones are tightened to effect a secure seal. Further, when the screws are tightened the pressure elements are forced downwardly to force edge portions of the lower neoprene gasket sealingly onto the upper free edges of the recesses and sealingly onto the smaller end portion of the base. The second washer-like resilient seals are pressed tightly onto the respective bases, substantially filling the space between the bases of the cones and the adjacent cylindrical recess walls, thereby providing an additional seal for the cross-over sealing means.

6 Claims, 7 Drawing Figures

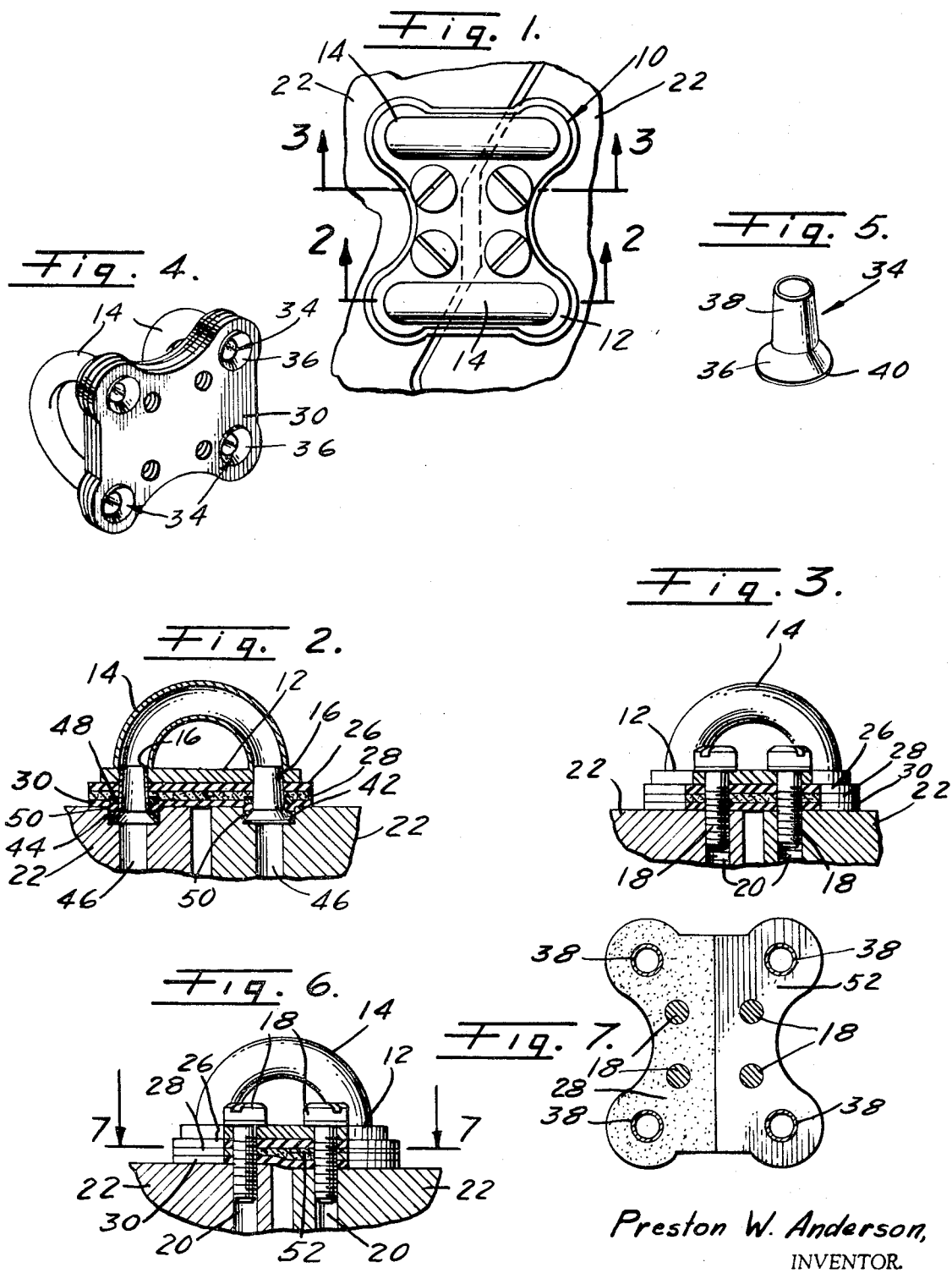
Preston W. Anderson,
INVENTOR.
BY J C Baisch
Attorney

CROSS-OVER SEALING MEANS

BACKGROUND OF THE INVENTION

1. Field of the Invention

This invention relates, generally, to sealing means and relates, more particularly, to sealing means for cross-over connections for internal fuel lines for the cylinder heads of deisel engines.

2. Description of the Prior Art

Certain deisel engines have a plurality of cylinder heads. Each head is for two cylinders and in certain engines there are three such heads. These cylinder heads are so close together that there is not enough room for any fuel line connections, so the fuel is taken through two openings in the top of the cylinder heads, through a cross-over connector consisting of two arched pipes or tubes soldered to a flat base.

There are two fuel lines in each cylinder head, carrying fuel to the injectors via the cross-over fuel line between the cylinder heads. This cross-over fuel line has two pipes or tubes, one carrying the fuel forward from the fuel pump and the other returning the fuel to the fuel tank. These fuel lines are under constant high pressure, feeding fuel to the injectors when the engine is running.

The openings on top of the cylinder heads include recesses that are larger in diameter than the diameter of the fuel lines and in the prior art there are O-rings in the recesses. When the cross-over connectors are attached to the cylinder heads the O-rings are compressed. However, the heat of the engine causes the O-rings to dry out and, quite often, they start to leak, creating a messy situation as well as a hazardous one, in addition to the loss of fuel.

Also, when the cross-over plate of the cross-over connection is bolted down firmly on each cylinder head, the cross-over connector is rigid and this puts a strain on the bolts used to fasten the same to the cylinder heads. Often, these bolts break off as a result of engine vibration or excessive tightening of the bolts, resulting in the cross-over connector becoming loose and allowing fuel to leak.

SUMMARY OF THE INVENTION

The present invention comprises sealing means for cross-over fuel line connectors for internal fuel lines in the cylinder heads of deisel engines having a plurality of such heads.

The internal fuel lines terminate in recesses adjacent the top edges of such heads, the cross-over connectors having a plate with cross-over tubes communicating with such recesses.

The sealing means of the present invention includes a lower neoprene gasket, a high-pressure rigid asbestos gasket, and on top of this asbestos gasket there is an upper neoprene gasket which is at the underside of the plate of the cross-over connectors. There is a cone for each end of the cross-over tube and each cone has a shank extending from an outwardly-flared base. The large end of the shank joins the small end of the base and the shank tapers from its juncture with said small end of the base. The outside diameter of the small end of each shank is smaller than the inside diameter of the cross-over tubes, while the outside diameter of the larger end of the shank is greater than the inside diameter of the tubes. The neoprene and asbestos gaskets have aligned openings therethrough for reception of the shanks of the cones, the shanks of said cones being pressed into the ends of the cross-over tubes so that said shanks have sealing connections with said tubes at a point intermediate the ends of said shanks.

On the shanks and between the asbestos gasket and the lower neoprene gasket are flat, resilient, washer-like pressure elements fitting snugly on the cones at the junction of the shanks and the respective bases. The bases have small flanges extending radially from their free ends and said flanges are small enough to fit closely into the recesses of the cylinder heads. A second washer-like resilient seal is disposed on each cone below the lower neoprene gasket, said second seal resting on the base.

There are screws extending through aligned openings provided therefor in the gaskets for securing the assemblage of the adjacent edge portions of adjacent cylinder heads, and when said screws are tightened the gaskets and cones are tightened to effect a secure seal. Further, when the screws are tightened the pressure elements are forced downwardly to force edge portions of the lower neoprene gasket sealingly onto the upper free edges of the recesses and into upper portions of the recesses, and sealingly onto the smaller end portions of the respective bases.

The second washer-like resilient seals are pressed tightly onto the bases of the respective cones and substantially filling the space between the bases of the cones and the adjacent cylindrical recess walls, thereby providing an additional seal for the cross-over sealing means.

Sometimes, the top surfaces of adjacent cylinder heads are at different levels and, should such a situation be found, a shim is placed between the lower neoprene gasket and the asbestos gasket to compensate for such difference in cylinder head levels.

OBJECTS AND ADVANTAGES OF THE INVENTION

It is an object of the invention to provide a cross-over sealing means that provides a very effective seal.

It is another object of the invention to provide means of this character that is simple in construction and highly effective in use.

Still another object of the invention is to provide sealing means of this character that is easy to manufacture and that is relatively inexpensive.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a top plan view of a cross-over connector having sealing means embodying the present invention;

FIG. 2 is a sectional view taken on line 2—2 of FIG. 1;

FIG. 3 is a sectional view taken on line 3—3 of FIG. 1;

FIG. 4 is a perspective view as seen from the underside of the connector and sealing means therefor;

FIG. 5 is a perspective view of a cone for the sealing means;

FIG. 6 is a sectional view showing a compensating shim in the sealing means to compensate for the difference in height of adjacent cylinder heads; and FIG. 7 is a view taken on line 7—7 of FIG. 6.

DESCRIPTION OF THE PREFERRED EMBODIMENT

Referring to the drawings, there is shown a cross-over connector, indicated generally at 10, having a plate 12 to which the ends of arcuate cross-over tubes 14 are secured by soldering or brazing, or the like, the ends of said tubes communicating with openings 16 provided therefor in the plate. The plate also has openings therethrough for screws 18 which are screwed into tapped openings 20 provided therefor in the cylinder heads adjacent their upper edges, said cylinder heads being indicated at 22.

The plate may be of any suitable configuration and the present cross-over sealing means comprises an upper gasket 26 of any suitable material such as neoprene, for example. This gasket is under the plate and said plate rests thereon. Below the gasket 26 is a substantially rigid gasket 28 of suitable material such as, for example, asbestos and below the gasket 28 is a lower flexible gasket 30 of suitable material such as, for example, neoprene. While the gaskets may be of any suitable shape, they are preferably of the same shape or contour as the plate 12, although they may be slightly larger. It is also to be noted that the gaskets have aligned openings therein for the screws 18, said screw openings being aligned with the screw openings in the plate.

The gaskets 26, 28 and 30 also have respective aligned openings therein that are in alignment with the openings 16 with which the cross-over tubes 14 communicate.

There are cones, indicated generally at 34, which comprise a flaring base 36 from the upper small end of which a shank 38 extends. The parts of the cone are, of course, integral and said cones are hollow. The shank 38 tapers from the small end of the base and the outside diameter of the small free end of the shank is smaller than the inside diameter of the cross-over tubes, particularly the openings 16 which are, in essence, part of the cross-over tubes 14. The outside diameter of the larger end of the shank is greater than the inside diameter of the tubes or openings 16. Thus, when the shanks 38 of the cones are disposed in the aligned openings provided therefor in the gaskets and the cross-over connector is secured to the cylinder heads by the screws 18, the cone shanks will engage the lower ends of the openings 16 intermediate the ends of the shanks and thereby provide a tight connection between the shanks and the lower end portions of said holes 16.

The large, or free end, of the base 36 has a slight radially-extending flange 40 and, when the cross-over connector is attached to the cylinder heads by the screws 18, the lower flanged end of the base rests on the shoulders 42 at the bottom of the recesses 44 at the ends of the fuel lines 46.

There are flat, resilient, washer-like pressure elements 48 on the shanks of the cones between the asbestos gasket and the lower neoprene gasket 30. There are, also, washer-like sealing elements 50 on the cones below the neoprene gasket 30. When the cross-over connector with the gaskets, cones, pressure elements 48 and seals 50 are secured to the cylinder heads, the pressure elements 48 force the portions of the lower neoprene gasket downwardly into the upper parts of the recesses 42 and, particularly, in tight-sealing engagement with the outer edges of the recesses 42. The pressure for thus pressing the parts of the neoprene gasket 30 into the upper parts of the recesses is transmitted through the substantially rigid asbestos gasket 28. At the same time, the seals 44 are forced downwardly on the bases of the cone and fill the space between the bases and the cylindrical walls of the recesses 42 and the portions of the neoprene gasket 30 forced into the upper part of said recesses.

Should one or more of the heads be surfaced, there may be a difference in the height of one or more of the heads, as shown in FIG. 6. When this condition occurs, a shim 52 is inserted in the assembly of gaskets. The shim is approximately one-half the size of the gaskets and is placed between the asbestos gasket and the top neoprene gasket to build up the side above the lower cylinder head. While one gasket is shown and described, it is to be understood that should the difference in the height of the adjacent cylinder heads require additional shims these may be used. The shims, of course, compensate for the difference in the heights of said cylinder heads.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific forms shown or uses mentioned, except as defined in the accompanying claims.

I claim:

1. Cross-over sealing means, comprising:
    A. a gasket of resilient material;
    B. a substantially stiff gasket at one side of said gasket of resilient material;
    C. said gaskets having a plurality of aligned openings therein in predetermined positions;
    D. a cone for respective aligned openings, each of said cones having:
        a. a base flaring from its upper smaller end,
        b. and a shank tapering upwardly from the smaller end of said base, said shank being smaller at its upper free end than at its lower end where it joins the smaller upper end of said base.

2. The invention defined by claim 1 wherein the resilient gasket is below the stiff gasket and there is a washer-like pressure element on the shanks of each of said cones between the stiff gasket and the resilient gasket.

3. The invention defined by claim 2, wherein the free end of each of the base of the cones has a radially-extending flange thereon.

4. The invention defined by claim 2, wherein the resilient gasket is of neoprene and the stiff gasket is of asbestos.

5. The invention defined by claim 2, including a washer-like seal on the base of the cone below the adjacent gasket.

6. The invention defined by claim 5, including a shim half the size of the gaskets and disposed on the shanks of the cones at one side of said gaskets, said shim being disposed between the gaskets.

* * * * *